United States Patent [19]

Shaffer

[11] Patent Number: 4,553,507
[45] Date of Patent: Nov. 19, 1985

[54] ENGINE WITH ADDITIONAL SHARED FLOW CONTROL RUNNER FOR TWO CYLINDERS

[76] Inventor: Donald J. Shaffer, P.O. Box 88, Upper Strasburg, Pa. 17265

[21] Appl. No.: 404,298

[22] Filed: Aug. 2, 1982

Related U.S. Application Data

[60] Division of Ser. No. 205,649, Nov. 10, 1980, Pat. No. 4,381,738, which is a continuation-in-part of Ser. No. 24,049, Mar. 26, 1979, Pat. No. 4,232,639.

[51] Int. Cl.⁴ ............................................. F02B 75/18
[52] U.S. Cl. ........................... 123/52 M; 123/52 MV; 123/432
[58] Field of Search ............... 123/52 M, 52 MB, 306, 123/308, 432

[56] References Cited

U.S. PATENT DOCUMENTS

| | | | |
|---|---|---|---|
| 2,179,143 | 11/1939 | Brown | 123/432 |
| 3,556,060 | 1/1971 | Henry-Biabaud | 123/432 |
| 3,977,366 | 8/1976 | Yamaguchi et al. | 123/432 |
| 4,164,205 | 8/1979 | Asanomi et al. | 123/432 |
| 4,181,105 | 1/1980 | Takemoto et al. | 123/308 |
| 4,194,474 | 3/1980 | Endo | 123/432 |
| 4,196,701 | 4/1980 | Tamura et al. | 123/308 |
| 4,265,207 | 5/1981 | Hayashida | 123/308 |
| 4,304,211 | 12/1981 | Tezuka et al. | 123/432 |
| 4,318,380 | 3/1982 | Matsumoto | 123/52 M |
| 4,325,346 | 4/1982 | Yokoyama | 123/52 M |

Primary Examiner—Craig R. Feinberg
Attorney, Agent, or Firm—Beall Law Offices

[57] ABSTRACT

Adjacent expansible chambers of an engine are provided with an intake runner set employing at least three runner passages conducting the working fluid from a common plenum to the expansible chambers, with at least one of the runners only serving one of the expansible chambers, at least another of the runners serving only the other expansible chamber, and at least still another of the runners commonly serving both of the expansible chambers. Preferably, a flow control is provided for one or more of the runners, preferably the common runner to manually or automatically control the flow of fluid through the common runner. Thereby, the runners for the expansible chambers may be adjusted in effective cross sectional area for tuned efficiency at different speeds. Preferably, such runners extend through the intake manifold and head ports without communication throughout their extent. The partitions forming the runners may be removable so that others of different shape or location may be substituted.

8 Claims, 10 Drawing Figures

ENGINE WITH ADDITIONAL SHARED FLOW CONTROL RUNNER FOR TWO CYLINDERS

RELATED INVENTION

This is a division of application Ser. No. 205,649, filed Nov. 10, 1980, and now U.S. Pat. No. 4,381,738, which is a continuation-in-part of Ser. No. 24,049, filed Mar. 26, 1979 and now U.S. Pat. No. 4,232,639 issued Nov. 11, 1980.

BACKGROUND OF THE INVENTION

The present invention relates to the construction of the intake passageway of an engine, particularly to the intake passageways in an intake manifold and head for an internal combustion engine.

The intake ports of a head and intake runners of an intake manifold operate most efficiently at one speed of the engine within the designed range of speeds for the engine. If this design speed is relatively low for the range of speeds, the engine will operate efficiently at low speeds, but at high speeds the passageways will "choke", that is they will not be able to provide sufficient flow of fluids to the engine for efficient operation. On the other hand, if the design speed for the passageways is relatively high for the speed range, the engine will operate efficiently at high speed, but at low speed it will operate quite inefficiently and rough. It is well known to provide after market intake manifolds that will provide for increased horsepower and fuel efficiency at high speeds, but the low speed or street use operation suffers.

For the standard "small-block Chevrolet engine", the intake runners for two adjacent cylinders are parallel to each other and share a common dividing wall in the head. It has been a common practice to grind the outer walls of this intake runner, but the amount of enlargement is really restricted by adjacent cooling chambers, push rods and necessary wall strength. It is also common to grind away the sides of the dividing wall to make it thinner. Each of these procedures will raise the speed at which the runners are "tuned" or will operate most efficiently, while at the same time decrease the efficiency for the lower speed range of the engine. This is satisfactory for racing purposes where the engine is run at very high speeds, and very seldom run at low speeds, but it is unsatisfactory for normal usage. Therefore, it is necessary for people who are racing to have one head designed for racing and one head designed for street use, and many people have several different heads depending upon the type of racing or street usage that will in turn determine the speed at which the engine is usually run. It is even known to completely grind away and eliminate the dividing wall within the head so that effectively the adjacent cylinders will share a common runner within the head. This will provide the very high flow volume needed at extremely high speeds, but at a great loss for the remaining speed range of the engine.

The volume of air (actually fuel air mixture for carbureted internal combustion engines, or only air for injected engines, or combustion products for external combustion engines) increases with increased engine speed, and it is easy to understand that the intake runners may be too small to provide this flow of air and it will therefore become "choked". However, the converse is also true that the intake runners may be too large for a lower speed in that the air will tend to be somewhat dead with high inertia, that is at low speeds it is desirable to have a smaller runner so that the velocity of the air may be maintained for efficiency of charging. All of this is well known in the design of intake runners.

SUMMARY OF THE INVENTION

It is an object of the present invention to improve the flow of fluids through the intake runner of an engine over a wide speed range.

According to the present invention, at least two cylinders share at least one common runner while at the same time having at least one allocated runner. In this manner, the effective flow through cross sectional area of the runner for each cylinder is increased, without increasing the combined runner area, as compared to conventional runners, because one runner is effective for both cylinders. This has the advantage of a high flow through cross sectional area for high speed operation, while for low speed operation the two runners will provide a satisfactory flow velocity due to the division, and/or one runner may be preferred so that it will operate predominantly at low speed and the second or shared runner will not come into operation until high speed, and/or controllable or automatic flow blockers may be employed for one or more runners, preferably the common runner, so as to effectively reduce the cross sectional area at low speed while permitting it to be higher for high speed. The partitions forming the runners are removable to be exchanged.

BRIEF DESCRIPTION OF THE DRAWING

Further objects, features and advantages of the present invention will become more clear from the following Detailed Description of a Preferred Embodiment, as described with respect to the accompany drawing, wherein.

DETAILED DESCRIPTION OF A PREFERRED EMBODIMENT

Figure 1:
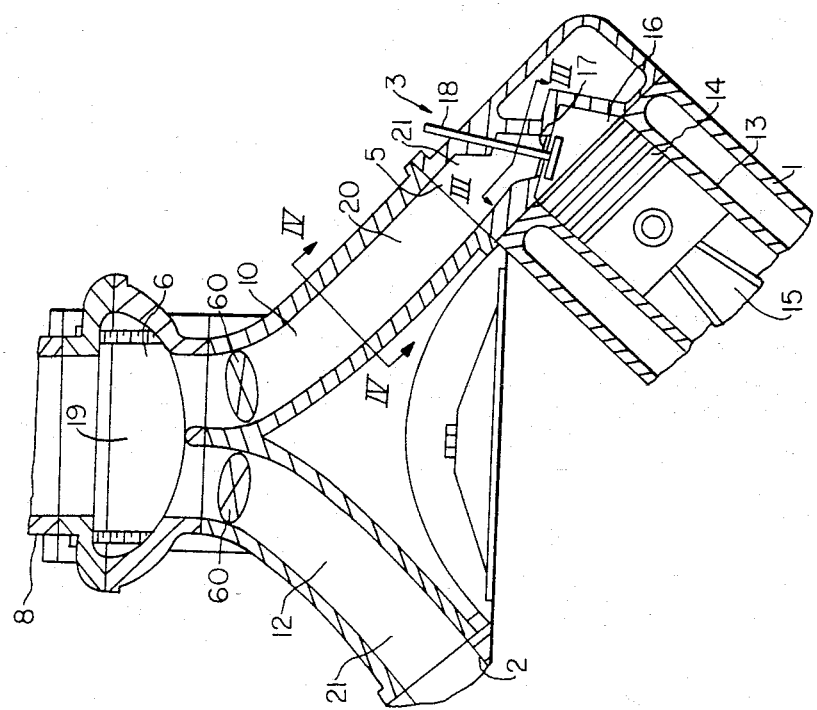
FIG. 1 is a perspective view of a conventional carburetor mounted upon an intake manifold leading to partially shown heads and block of a V-8 engine.

The preferred embodiment of the present invention applies to and is illustrated with respect to an internal combustion engine, although according to its very broad aspects, it is contemplated that it is usable with respect to external combustion engines, engines of either reciprocating piston or rotary piston type, carbureted internal combustion engine or fuel injected internal combustion engines, or the like type of engines wherein gases are drawn through an intake manifold and intake ports to expansible chambers, wherein adjacent runners of the intake manifold or ports supply two expansible chambers.

The preferred embodiment in the drawing is with respect to a V-8 engine, specifically the Chevrolet small-block engine, heads that are conventional except for the modifications to be explained herein, an intake manifold that is conventional except for the modification explained herein, and a conventional single carburetor. The invention is equally applicable to such a setup with two carburetors.

The invention is most advantageous with respect to an expansible engine of the type wherein two intake runners, for air, air-fuel mixture, or combustion products, are adjacent to each other and lead to intake ports of two adjacent expansible chambers. In the following description, air will broadly refer to a working fluid such as air for an injected engine, an air-fuel mixture for a carbureted engine, or combustion products for an external combustion engine.

While FIG. 1 broadly discloses an entire engine, the remaining Figures are specific to those portions of an otherwise specific conventional engine that are different in structure according to the present invention.

In FIG. 1, there is shown a conventional "small-block" Chevrolet internal combustion engine block 1 of a V-8 configuration. Two mirror image heads 2, 3 are mounted on the block in a conventional manner. These heads are conventional heads for this type of block, except for the modifications of the air passages that will be noted below. Secured to each of the heads 2, 3 there is an intake manifold 4, which has flanges 5 respectively bolted to the heads 2, 3. This intake manifold 4 is conventional for this type of engine, except for the specific design of the intake runners according to the present invention, as mentioned hereinafter. Secured to the top 6 of the intake manifold 4 by means of bolts passing through respective flanges 7, there is a conventional carburetor 8 having an air intake 9. Those portions of the carburetor, intake manifold, heads and block that are not specifically shown and described are conventional in detail.

In a conventional manner, such a V-8 engine has eight cylinders arranged in a V shape, with four cylinders on each side. The head 2 covers four cylinders on one side, while the head 3 covers four cylinders on the other side. The intake manifold has four sets of intake runners that are similar in construction. One set of intake runners 10 leads from a plenum chamber in the top portion 6 of the intake manifold to the intake ports in the head 3 for two adjacent cylinders, while the other set of runners 11 for the head 3 leads from the same common plenum chamber of the intake manifold to the intake ports of head 3 serving a different pair of adjacent cylinders. A third set of intake runners 12 lead from the common plenum chamber within the upper portion 6 of the intake manifold to the adjacent ports of head 2 for a third pair of adjacent cylinders. In a similar manner, a fourth set of intake runners (not shown in FIG. 1) lead from the common plenum chamber to the fourth set of adjacent intake ports for the head 2 serving the remaining two adjacent cylinders.

Figure 2:
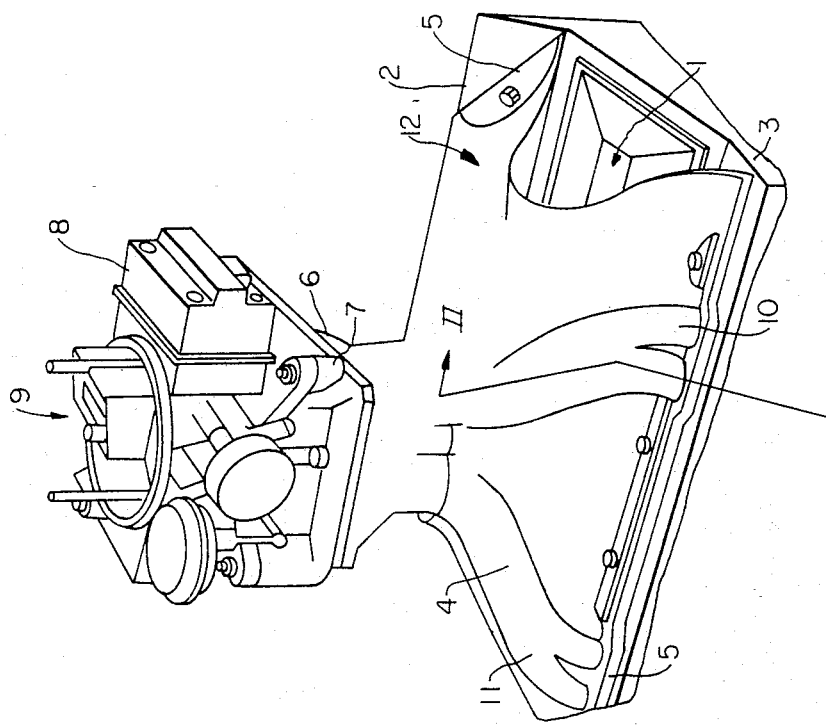
FIG. 2 is a cross sectional view taken along line II—II of FIG. 1.

In FIG. 2, a portion of the block 1 is shown with one of its cylinders 13 containing a conventional piston 14 mounted on a crank arm 15 leading to a crankshaft (not shown), for reciprocating the piston 14 within the cylinder 13 so as to form an expansible chamber 16 that is closed by the head 3. In a conventional manner, the head 3 includes a valve seat 17, a valve 18 for the intake throttle valves 60 functioning as flow control means for manually controlling the flow of fluid through the valves 18, and the conventional mechanisms to complete the engine which are not shown, but which include spark plug, exhaust valve, and valve operating mechanism. The air-fuel mixture coming from the carburetor 8 fills the common single plenum chamber 19, from where it is fed to the individual sets of runners including 10, 11, 12. The air-fuel mixture passing through the runner set 10 is fed through the runner portion 20 within the intake manifold and the runner portion 21 within the intake port of the cylinder head 3. When the valve 18 is opened, the intake will pass through the valve 18 between the valve 18 and the seat 17 and into the expansible chamber 16 as the piston 14 is lowered during the intake stroke.

From U.S. Pat. No. 4,232,639, it is seen that the intake runner sets are all substantially the same in essential features, so that only the runner set 10 will be described in detail. Preferably, the intake manifold 4 is cast in one piece, with the runner set 10 including a first runner passage 22, (FIG. 4) a second runner passage 23, and a third runner passage 24, although more runner passages could be provided. Each of these runner passages is completely separate from the others, that is, their walls are continuous throughout their length, for example as shown in FIG. 4.

Figure 3:
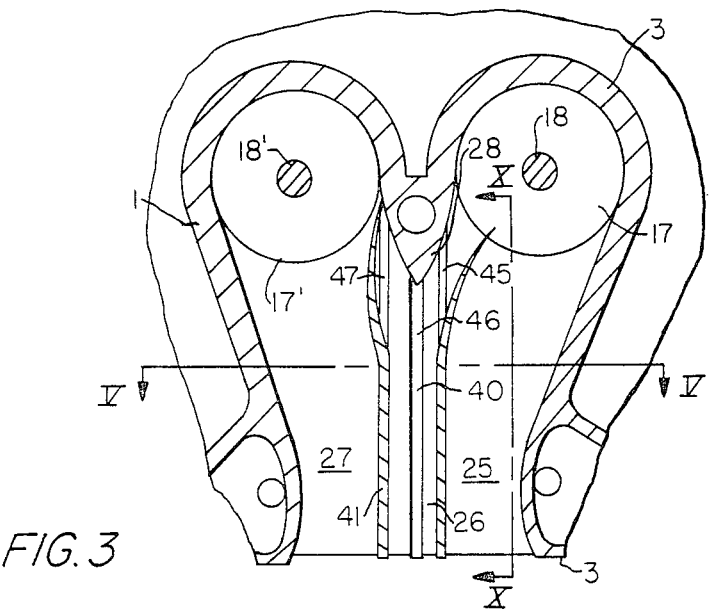
FIG. 3 is a cross sectional view of the cylinder head taken along line III—III of FIG. 2.
Figure 4:
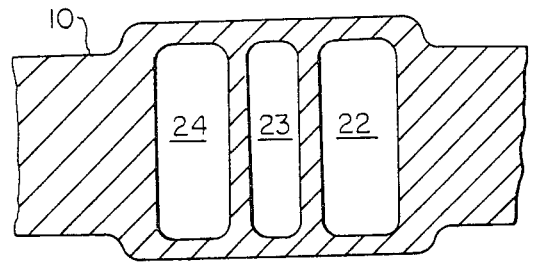
FIG. 4 is a view taken from line IV—IV of FIG. 2.

FIG. 4 shows the configuration for the runner passages of the intake manifold, the view from line V—V of FIG. 3 for the intake manifold would be substantially the same, and the configuration of the passages would be identical for both the head and manifold at this common plane where they are connected, with a conventional gasket, as more fully shown in FIG. 2. As seen in FIGS. 2 and 4, the intake manifold of the present invention differs from the conventional intake manifold for this type of engine in that at least three intake runner passage portions 22, 23 and 24 are provided instead of only two in the conventional manifold.

Figure 5:
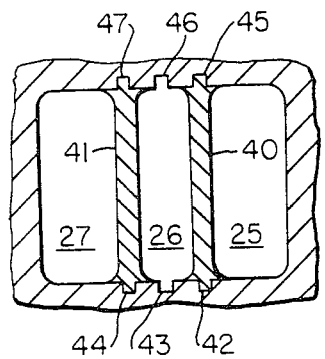
FIG. 5 is a cross sectional view taken along line V—V of FIG. 3.

As seen in FIGS. 3 and 5, the head 3 is provided with adjacent valves 18 and 18' that cooperate with adjacent valve seats 17, 17', which lead to adjacent cylinders (not shown) within the block, respectively. The runner passage portion 25 within the cylinder head port lines up with the passage 24, the cylinder head passage 26 lines up with the passage 23, and the cylinder head passage 27 lines up with the passage 22, when they are assembled as shown in FIG. 2, with a suitable gasket being employed so that there is no communication between the passageways 25, 26 and 27 or the passages 22, 23, 24 at the place where the head joins the manifold. As shown in FIG. 5, the walls forming the runner passages 25, 26 and 27 are continuous for the full height of the passages, so that there is no communication between them.

Figure 8:
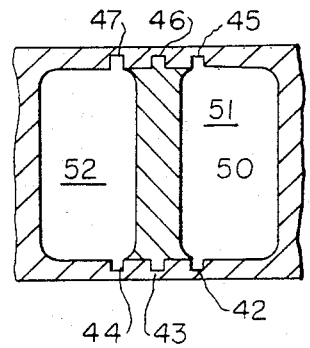
FIG. 8 is a modification of FIG. 5.

The head opening leading to the adjacent valves 18, 18' is provided with three opposed pairs of slots: 42 and 45 that receive a mating configured portion of partition wall 40; 43 and 46 that can receive the mating configured portions of a central partition wall 50 shown in FIG. 8 to replace the partition walls 40, 41 to return the head to a conventional construction; and 44, 47 receiving the mating configured portions of partition wall 41. If partition walls 40 and 41 are replaced by partition wall 50 as shown in FIG. 8, the partition wall 50 would extend completely to the head portion 28 to completely or substantially completely seal and separate two runners 51, 52 that would be conventional in shape and size, for example. Also, the partition walls 40 and 41 could be replaced by partition walls 48 and 49 as shown in FIG.

9 that would be thicker, to make the runners 25, 26 and 27 smaller, for tuning the engine to a lower speed. Further, the partition walls 40 and 41 of FIGS. 3 and 5 could be replaced by partition walls 53, 54 of FIG. 7 and 55, 56 of FIG. 6. The partitions would be exchanged merely by removing the manifold, without requiring removal of the head. The slots 42–47 are all straight, and preferably parallel, to facilitate such exchange. That portion of the partition walls shown in FIGS. 3, 6 and 7 that does not overlie the slots would not in fact extend in any slots and the mating portion for the slots would terminate at that point where the straight portion of the partition wall joins the above-mentioned portion of the partition wall that does not overlie the slot. The partition walls of FIG. 6 and FIG. 7 may be exchanged for similarly shaped walls, but of different thickness.

Figure 9:
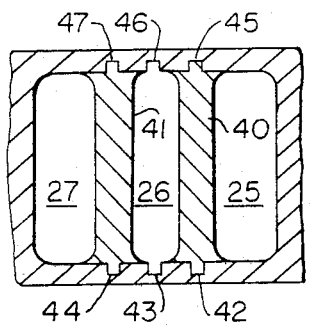
FIG. 9 is a modification of FIG. 5.
Figure 10:
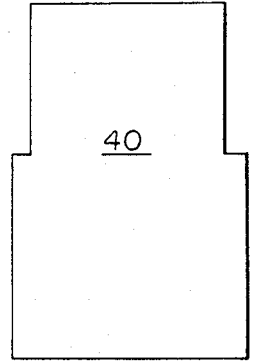
FIG. 10 is a view from line X—X.

In FIG. 3, the partition walls 40 and 41 are constructed of spring sheet steel. That portion of the partition walls 40 and 41 extending from the inlet port to the line V—V extends into the respective slots 42, 45, 44, 47, whereas the inner portion of the partition walls 40 and 41 is smaller in height as shown in FIG. 10 so as not to extend into any slot, so that it may be free to move within the plane of FIG. 3. In its relaxed configuration, each of the partition walls 40 and 41 assumes the position as shown with respect to partition wall 41 in FIG. 3 wherein it is curved to sealingly engage the fixed portion of the head to sealingly separate or substantially so, the runner 26 from the runner 27 at low speed so as to render the runner 26 inoperative. With such a construction, it would be unnecessary to provide any valving or flow control in the intake manifold runners, such as are described in the above-mentioned patent. At high speed, there would be sufficient suction adjacent the valve seats 17, 17', so that the inner end of each partition wall would bend to the configuration or towards the configuration shown with respect to partition wall 40 in FIG. 3, wherein the adjacent valve would draw air from two runners, for example valve 18 would draw air from runners 25 and 26. These partition walls can be designed to open up, that is, bend from the position of wall 41 to the position of wall 40 at a fixed speed and to different degrees for different speeds, as desired. Such opening may be substantially permanent at the speed with some flutter, or the resiliency of the spring steel may be so chosen that the partition wall will effectively close each time its ajacent valve closes; in this latter situation, the positioning of the partition walls as shown in FIG. 3 would correspond to valve 18 being open and valve 18' being closed at high speed. With a thicker partition wall being employed such as shown in FIG. 9, the thickness would apply only to the fixed portion of the partition wall between the lines V and X, whereas the bendable portion of the partition wall would be thinner to provide the desired spring characteristics.

Figure 6:
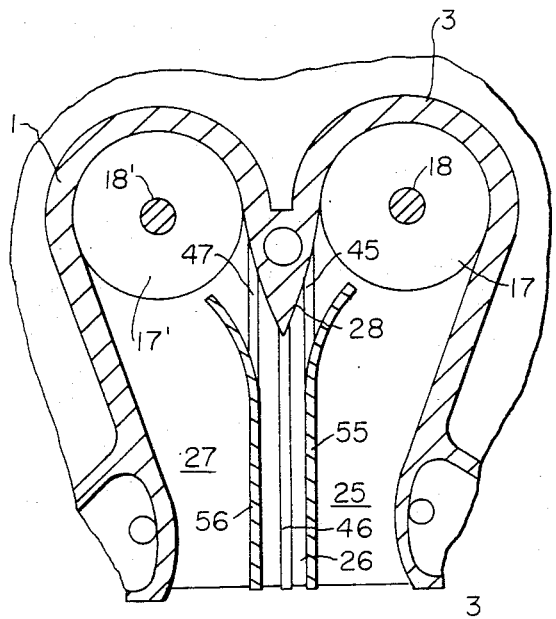
FIG. 6 is a view corresponding to FIG. 3, but of a modification of the structure of FIG. 3.

In FIG. 6, the partition walls of FIG. 3 have been replaced by similar partition walls that have sufficient stiffness so that they will not undergo any substantial bending, that is they will always remain in their illustrated position throughout the entire speed range of the engine; in such a case, it is desirable to provide some type of flow control in the intake manifold, such as that shown in the above-mentioned patent, to provide for effective closure of the runner 26 at low speed.

Figure 7:
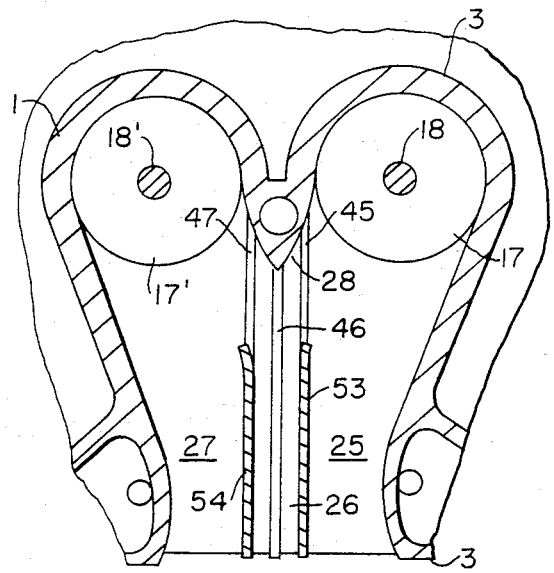
FIG. 7 is a view corresponding to FIG. 3, but of a modification of the structure of FIG. 3.

In FIG. 7, the partition walls 53 and 54 are rigid, that is they do not bend, and they extend only inwardly to the line V—V. Again, it would be preferable to provide for some flow control as in the above-mentioned patent to block off the runner 26 at low speed.

While it is seen that in the closed position of the partition walls in FIG. 3, the runners 25 and 27 are substantially separated to prevent communication, if the spring characteristics of the walls 40 and 41 were so chosen that at high speed both walls would assume the position shown with respect to wall 40 in FIG. 3, there would appear to be communication between runners 25 and 27. Similarly, there appears to be substantial communication between runners 25 and 27 in FIGS. 6 and 7. However, runner 25 remains substantially exclusive to valve 18 whereas runner 27 remains substantially exclusive to valve 18', because at the speeds of engine operation, the air will be moving so fast through the runners and tuned to the runners so that it will not follow a tortuous path from runner 25 to valve 18' or from runner 27 to valve 18 to any appreciable extent, particularly at high speeds wherein the present invention is most useful. There may be some crossover at idle when the air flow is small.

Thus it is seen that at low speeds the engine will effectively have smaller runners than conventional sized runners that would correspond to FIG. 8, because the runner 26 would be blocked, which would improve efficiency and power with respect to a conventional engine. However, at higher speeds, the runner 26 would come into operation to provide an effective greater runner size than conventional for the higher speeds to correspondingly provide better efficiency and power. Further, with the runner being divided at high speeds, there would be better flow characteristics. Thus, the efficiency of the engine is greatly improved over a wider range of speeds.

While only three runners for a runner set serving adjacent cylinders have been shown with one of the three being commonly used by the adjacent cylinders at high speed, it is contemplated that according to the present invention, more runners could be employed for the same set, for example there could be two common runners in addition to the two exclusive runners, which would be particularly advantageous with respect to the control wherein flow controls of the nature shown in the above-mentioned patent could be separately provided in each of the common runners to operate at correspondingly different speeds.

The flow control for one or more of the runners is provided by the flow controllers disclosed in the above-mentioned patent, which would be used in addition to or in place of the flow control provided by the resilient portions of the partition walls 40 and 41.

While a preferred embodiment of the present invention has been set forth for purposes of illustration in addition to the advantages gained by the specific details, with modification, still further embodiments, modifications and variations are contemplated according to the present invention, all as determined by the spirit and scope of the following claims.

What is claimed is:
1. An internal combustion engine, including:
two expansible working chambers;
separate first and second intake valve means for respectively supplying working fluid to said two expansible chambers;
a source of working fluid; and
a manifold serially connected between said source of working fluid and said valve means to supply working fluid to said two expansible chambers, said manifold having a single plenum chamber for re- ceiving the working fluid, a first runner fluid connected between said plenum chamber and said second intake valve means so as to substantially exclusively provide working fluid from said source to said first one of said valve means, a second runner fluid connected between said plenum chamber and said second intake valve means so as to substantially exclusively provide fluid from said source to said second intake valve means, and a third runner fluid connected between said plenum chamber and both of said intake valve means so as to commonly provide working fluid from said source to each of said intake valve means and so that said single plenum chamber is common to all three of said runners;

first flow control means for manually controlling the flow of fluid through said first and second valve means only and having a closed idle position and open position;

second flow control means independent of said first flow control means, having a first closed position restricting fluid flow through said third runner and a second open position permitting free fluid flow through said third runner; and control means automatically responsive to an engine output condition correlated to speed of said engine to maintain said second flow control means in its first closed position at idle and speeds below a fixed low engine speed that is substantially above idle and maintain said second flow control means in its second open position at all engine speeds above a fixed high speed independently of the manual operation of said first flow control means.

2. An internal combustion engine according to claim 1, wherein said source of working fluid is a carburetor providing an air fuel mixture as the working fluid.

3. The internal combustion engine according to claim 2, wherein said first, second and third runners are throughout substantially their entire length immediately adjacent each other and in parallel flow, wherein each of said runners defines a central flow line extending along its entire length, with the central flow lines of all of the runners being within a common plane.

4. The internal combustion engine according to claim 1, wherein said first, second and third runners are throughout substantially their entire length immediately adjacent each other and in parallel flow, wherein each of said runners defines a central flow line extending along its entire length, with the central flow lines of all of the runners being within a common plane.

5. The internal combustion engine according to claim 4, wherein said second flow control means is a movable valve plate, and said control means provides a bias on said plate opposite to the force on said plate caused by working fluid flowing towards said expansible chambers and in the direction of said first position so that the bias is sufficient to close the valve plate and substantially stop flow within said third runner at low engine speeds and to progressively open at higher engine speeds according to engine vacuum.

6. The apparatus of claim 1, wherein said second flow control means is a movable valve plate, and said control means provides a bias on said plate opposite to the force on said plate caused by working fluid flowing towards said expansible chambers and in the direction of said first position to progressively open said second flow control means in a speed range between said fixed low speed and said fixed high speed.

7. The internal combustion engine according to claim 6 wherein said first, second and third runners are throughout substantially their entire length immediately adjacent each other and in parallel flow, wherein each of said runners defines a central flow line extending along its entire length, with the central flow lines of all of the runners being within a common plane.

8. The internal combustion engine according to claim 7, wherein said second flow control means is a movable valve plate, and said control means provides a bias on said plate opposite to the force on said plate caused by working fluid flowing towards said expansible chambers and in the direction of said first position so that the bias is sufficient to close the valve plate and substantially stop flow within said third runner at low engine speeds and to progressively open at higher engine speeds according to engine vacuum.

* * * * *